(12) United States Patent
Hinokuma et al.

(10) Patent No.: US 7,087,340 B2
(45) Date of Patent: Aug. 8, 2006

(54) PROTON CONDUCTING ELECTRODE, METHOD FOR PREPARATION THEREOF AND ELECTRO-CHEMICAL DEVICE

(75) Inventors: Koichiro Hinokuma, Kanagawa (JP); Minehisa Imazato, Tokyo (JP)

(73) Assignee: Sony Corporation, Tokyo (JP)

( * ) Notice: Subject to any disclaimer, the term of this patent is extended or adjusted under 35 U.S.C. 154(b) by 774 days.

(21) Appl. No.: 10/110,277

(22) PCT Filed: Aug. 7, 2001

(86) PCT No.: PCT/JP01/06793

§ 371 (c)(1),
(2), (4) Date: Aug. 2, 2002

(87) PCT Pub. No.: WO02/13295

PCT Pub. Date: Feb. 14, 2002

(65) Prior Publication Data

US 2003/0013003 A1  Jan. 16, 2003

(30) Foreign Application Priority Data

Aug. 8, 2000  (JP) .......................... P2000-239839

(51) Int. Cl.
    *H01M 4/86* (2006.01)
(52) U.S. Cl. .............. 429/44; 429/40; 429/41; 429/30; 429/33; 502/101
(58) Field of Classification Search .......... 429/30, 429/33, 40, 41, 44; 502/101; 204/294
    See application file for complete search history.

(56) References Cited

U.S. PATENT DOCUMENTS

| 5,234,475 A | 8/1993 | Malhotra et al. ............. 44/282 |
| 5,470,680 A * | 11/1995 | Loutfy et al. ............ 429/218.2 |
| 5,475,172 A | 12/1995 | Cahill et al. ................. 585/27 |
| 5,811,460 A | 9/1998 | Friedman et al. ........... 514/563 |
| 6,495,290 B1 * | 12/2002 | Hinokuma et al. ...... 429/231.8 |

FOREIGN PATENT DOCUMENTS

| JP | 3-71568 | 3/1991 |
| JP | 8-31444 | 2/1996 |

OTHER PUBLICATIONS

Long Y. Chiang et al., *Multi-hydroxy Additions onto C60 Fullerene Molecules*, J. Chem. Soc., 1992 pp. 1791-1793.
Long Y. Chiang et al., *Efficient Synthesis of Polyhydroxylated Fullerene Derivatives via Hydrolysis of Polycyclosulfated Precursors*, American Chem. Society, 1994, pp. 3960-3969.

* cited by examiner

Primary Examiner—Bruce F. Bell
(74) Attorney, Agent, or Firm—Bell, Boyd & Lloyd LLC

(57) ABSTRACT

A proton conducting electrode is provided. The proton conducting electrode includes a mixture of a fullerene derivative and an electron conducting catalyst, wherein the fullerene derivative is composed of carbon atoms that can form fullerene molecules and one or more proton ($H^+$) dissociating groups introduced into said carbon atoms. The proton conducting electrode can be manufactured by coating a mixture containing the fullerene derivative and the electron conducting catalyst on a gas transmitting current collector. The proton conducting electrode can be used in a variety of applications, such as in electrochemical devices, including fuel cells.

48 Claims, 9 Drawing Sheets

PROTON CONDUCTING ELECTRODE, METHOD FOR PREPARATION THEREOF AND ELECTRO-CHEMICAL DEVICE

RELATED APPLICATION DATA

The present application claims priority to Japanese Patent Document No. P2000-239839 herein incorporated by reference to the extent permitted by law.

BACKGROUND OF THE INVENTION

The present invention relates to a proton ($H^+$) conducting electrode, a method for its preparation and to an electro-chemical device employing a proton conducting electrode.

A variety of electro-chemical devices, constructed on the basis of a reaction of decomposition of a hydrogen gas, or a chemical substance containing hydrogen atoms, on an electrode to yield protons ($H^+$) and electrons, a reaction of protons and electrons to yield hydrogen, or a reaction of protons, electrons and oxygen or another substance to yield water or a further substance, such as fuel batteries or other proton-type batteries, or chemical sensors, have been proposed.

Since electrons, protons and other substances, such as hydrogen gas, oxygen gas or water, are involved in the above various reactions, the site where all of these substances meet together represents a sole site of reaction.

For example, if a catalyst exhibiting electronic conductivity is supplied in a more or less dispersed state onto the surface of a proton conductor, the contact point between the protonic conductor and electrons and in its vicinity represent a site where protons, electrons and other gaseous substances can exist together. In general, such site is termed a three-phase interface.

FIG. 1 shows a prior-art example of an electrode structure. In the electrode structure, shown in FIG. 1, a catalyst 3 exhibiting electronic conductivity is dispersed on the surface of a proton conductor 1, with the surface of the catalyst being then covered by a gas transmitting current collector 5. If only the surface of the proton conductor 1, with the catalyst 3 dispersed thereon, is used for the reaction yielding the protons ($H^+$) and electrons, a three-phase interface 7 is present in the vicinity of contact points of the proton conductor 1 and the catalyst 3. However, the site where all of electrons ($e^-$) 4, protons ($H^+$) 8 and gases 6, such as hydrogen gas or oxygen gas, meet together, is limited to a point-like area, this point-like area serving as a sole three-phase interface, with the result that the function as the electrode is not manifested satisfactorily.

Currently, for improving the function as an electrode, such a technique is used which consists in mixing proton-conducting components into an electrode material for forming a three-phase interface on the surface of the protonic conductor throughout the entire electrode formed to a certain thickness.

With this technique, electronic conducting paths are formed in a meshed pattern within the electrode by the catalyst itself or by an electrically conductive assistant material specifically mixed into the electrode material, whilst the proton conductor contained is also formed in a meshed pattern. If the other component than protons and electrons is a gas, the electrode itself is to be porous to allow the gas to be permeated throughout the electrode. If the other component is not a gas but a solid phase, the solid phase is added to the electrode. In any of these cases, the three-phase interface is to be formed over the entire electrode, as described above, to provide for as many reaction points as possible to improve the function as the electrode.

It is noted that, in the above electrode operating at a temperature lower than 100° C., inclusive of the ambient temperature, a proton dissociating liquid or a proton conducting high-polymer solid electrolyte, such as Nafion, manufactured by Du Pont, de Nemur, is currently used as the protonic conductor mixed into the electrode. In particular, with the use of Nafion, the device may be solidified, and hence may find extensive application. Thus, the device tends to be used extensively as a fuel battery for low temperature.

However, Nafion, which is a solid material, suffers a problem that, by reason of its proton conduction mechanism, its proton conduction performance is not displayed except if the Nafion itself is soaked with a sufficient amount of water. Thus, if Nafion is contained in an electrode, the device is difficult to use continuously under a dry atmosphere.

A need therefore exists to provide an improved proton conducting electrode that can be readily made and effectively used.

SUMMARY OF THE INVENTION

In view of the above-described status of the art, it is an advantage of the present invention to provide a proton conducting electrode in which three-phase interface exists abundantly within the electrode and which not only has enhanced properties as electrode but exhibits only small atmosphere dependency, a method for its preparation, and an electro-chemical device.

In an embodiment, the present invention provides a proton conducting electrode including a mixture that includes a fullerene derivative and an electron conducting catalyst, wherein the fullerene derivative is composed of carbon atoms forming fullerene molecules and a proton dissociating group introduced into the carbon atoms.

As used herein, the term "proton dissociating group" or the like means a functional group capable of releasing protons on electrolytic dissociation, and the term "dissociation of protons ($H^+$)" or the like means separation of protons from the functional group on electrolytic dissociation.

Since the proton conducting electrode of the present invention is comprised of the fullerene derivative having the capability of proton dissociation, and the electron conducting catalyst, a three-phase interface can be made to exist in a sufficient quantity in the electrode and hence has enhanced properties with respect to, for example, generating and propagating the protons.

Since the proton conducting electrode of the present invention uses the fullerene derivative, it exhibits only negligible atmosphere dependency allowing it to have enhanced proton conductivity even in a dry atmosphere. However, it may also be used in the presence of the moisture.

The proton conducting electrode according to an embodiment of the present invention is prepared by a method that includes coating a mixture of a fullerene derivative, composed of carbon atoms forming fullerene molecules and a proton dissociating group introduced into the carbon atoms, on a gas transmitting current collector.

Since the proton conducting electrode according to an embodiment of the present invention can be produced by a step of coating the above-mentioned mixture on the gas transmitting current collector, the particle distribution density can be adjusted with relative ease. Moreover, since the mixture can be coated in multiple layers, a desired film thickness can be produced.

The electrochemical device according to an embodiment of the present invention includes a first electrode, a second electrode and a proton conductor sandwiched or disposed between these first and second electrodes, wherein a proton conducting electrode comprising of a mixture of a fullerene derivative and an electron conducting catalyst, wherein the fullerene derivative is composed of carbon atoms forming fullerene molecules and a proton dissociating group introduced into the carbon atoms, forms at least the first electrode of the first and second electrodes.

In the electro-chemical device according to an embodiment of the present invention, in which at least the first electrode of the first and second electrodes is constructed by the proton conducting electrode, composed of the fullerene derivative and the catalyst, enhanced current density and output characteristics can be achieved. The electrochemical device can function without moisture, allowing it to have enhanced properties even under a dry atmosphere, and can be used continuously.

Additional features and advantages of the present invention are described in, and will be apparent from, the following Detailed Description of the Invention and the Figures.

DETAILED DESCRIPTION OF THE INVENTION

The present invention generally relates to proton conducting materials. More specifically, the present invention relates to electrodes, electro-chemical devices, other suitable devices and methods of preparing and using same that employ proton conducting materials, such as fullerene-based materials that have proton dissociating properties.

Figure 1:
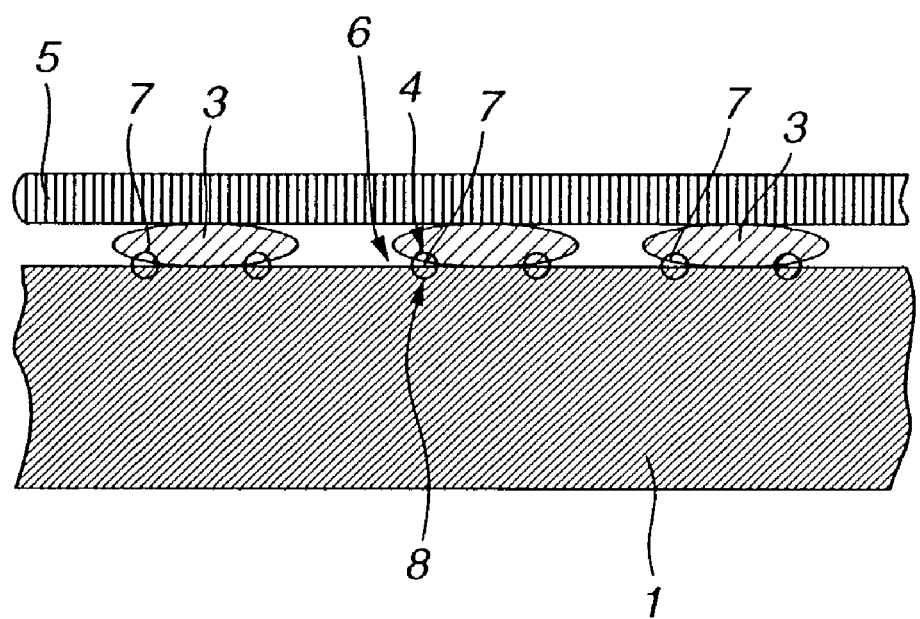
FIG. 1 is a schematic cross-sectional view showing a conventional electrode employing a proton conductor.
Figure 2B:
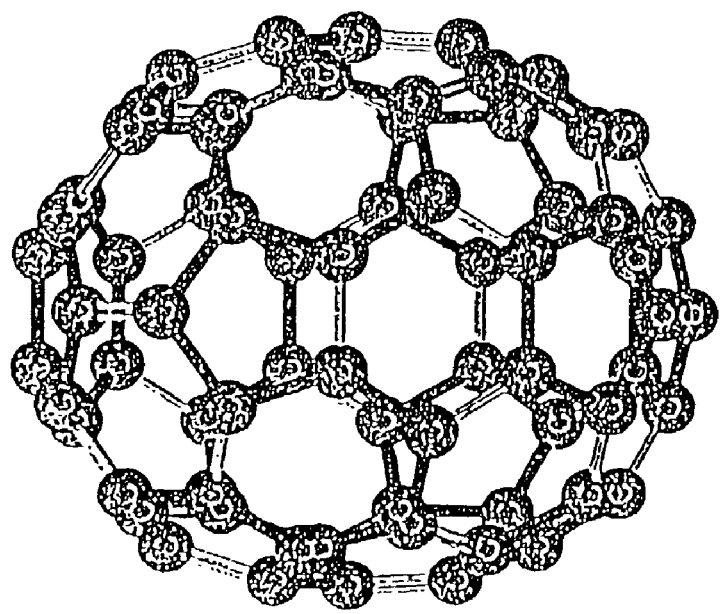
FIGS. 2A and 2B show molecular structures of $C_{60}$ and $C_{70}$, respectively.
Figure 2A:
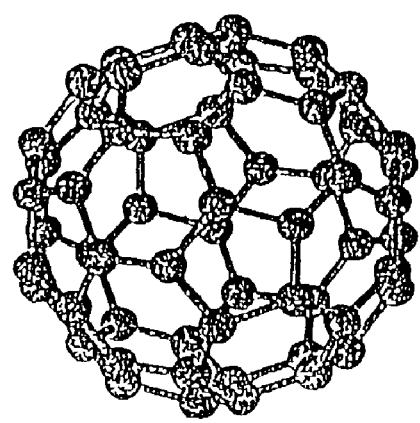

It should be appreciated that there is no particular limitation to fullerene molecules, as a matrix into which proton dissociating groups, used in accordance with an embodiment of the present invention, are to be introduced, provided that they are spherically-shaped cluster molecules. However, fullerene molecules per se, as selected from $C_{14}$, $C_{20}$ (see FIG. 2A), $C_{70}$ (see FIG. 2B), $C_{76}$, $C_{78}$, $C_{80}$, $C_{82}$ or $C_{84}$, or mixtures of two or more of these fullerene molecules, are usually preferred.

These fullerene molecules were discovered in the mass spectrograph of a cluster beam by laser ablation of carbon in 1985 (Kroto, H. W.; Heath, J. R.; O'Brien, S. C.; Curl, R. F.; Smalley, R. E. Nature 1985.318,162). The manufacturing method was actually established five years later. That is, in 1990, the manufacturing method by the arc discharge method of carbon electrodes was found and, since that time, fullerene attracted notice as being a carbonaceous semiconductor material.

The present inventors have conducted a variety of research into the proton conductivity of derivatives of fullerene molecules, and found that fullerene polyhydroxide, obtained on introducing hydroxy groups into the constituent carbon atoms of fullerene, exhibits high protonic conductivity over a wide temperature range inclusive of an ambient temperature range, that is over a temperature range of at least 160° C. to about 40° C., inclusive of the solidifying point and boiling point of water. It was also found that this protonic conductivity becomes more enhanced when a hydrogen sulfate ester group is introduced in place of the hydroxy group into the constituent carbon atoms of fullerene.

Figure 3B:
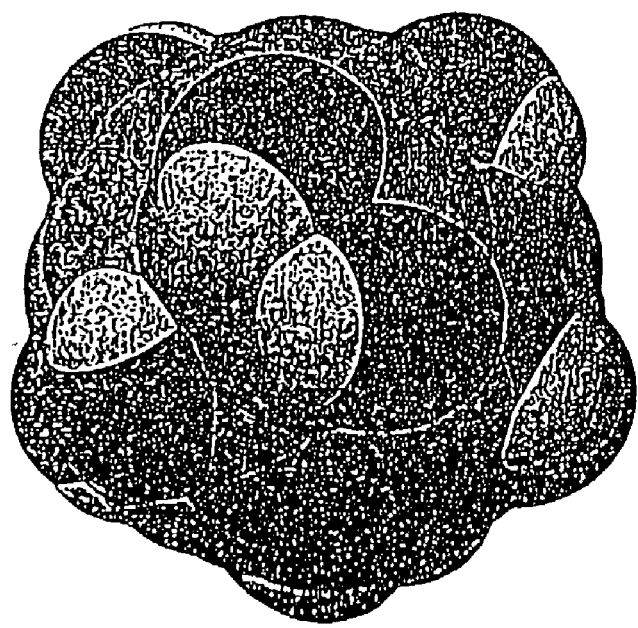
FIGS. 3A and 3B show structures of fullerene polyhydroxide as a fullerene derivative according to an embodiment of the present invention.
Figure 3A:
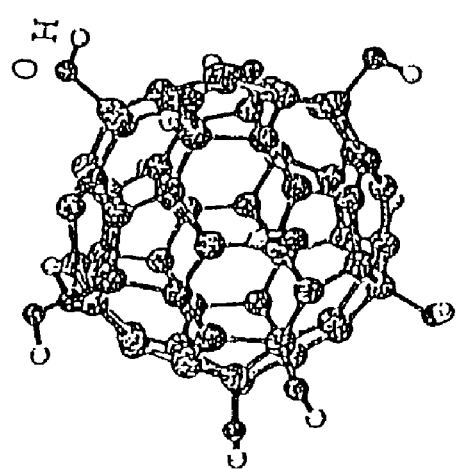

More specifically, fullerene polyhydroxide is a generic term of compounds that include fullerene and a number of hydroxy groups added thereto, as shown in FIGS. 3A and 3B, and is commonly referred to as fullerenol. As a matter of course, the number of hydroxy groups or the arrangement thereof in the molecular structure may be varied in a number of suitable ways. Synthesis examples of fullerenol were first reported in 1992 by Chiang et al (Chiang, L. Y.; Swirczewski, J. W.; Hsu, C. S.; Chowdhury, S. K.; Cameron, S.; Creegan, K., J. Chem. Soc., Chem. Commu. 1992, 1791). Since that time, fullerenol, having hydroxy groups introduced in more than a preset amount therein, has attracted notice in particular as to its water-solubility, and has been researched mainly in the bio-related technical field.

Figure 4A:
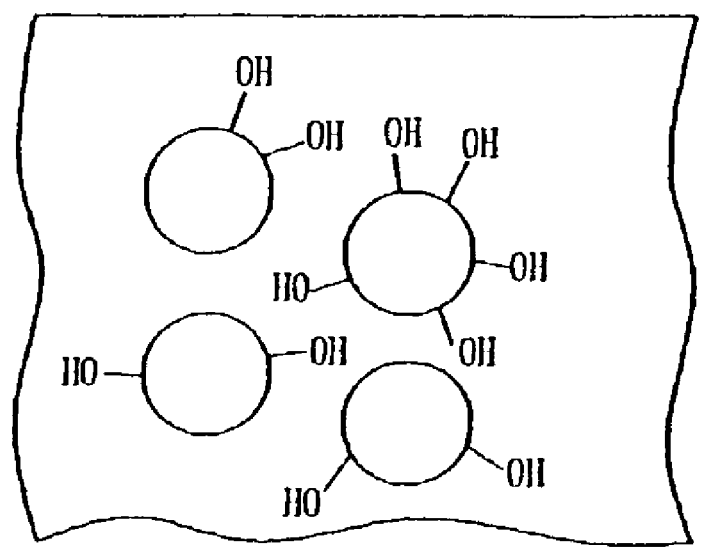
FIGS. 4A and 4B are schematic views showing examples of fullerene derivatives according to an embodiment of the present invention.

The present inventors have formed fullerenol into an aggregate, as shown schematically in FIG. 4A, so that interaction will be produced between hydroxy groups of proximate fullerenol molecules, indicated by the circle symbols in the drawing, and have uniquely found, that this aggregate exhibits high protonic conductivity, in other words, dissociation of $H^+$ from phenolic hydroxy groups of the fullerenol molecules, as a macroscopic mass.

Figure 4B:
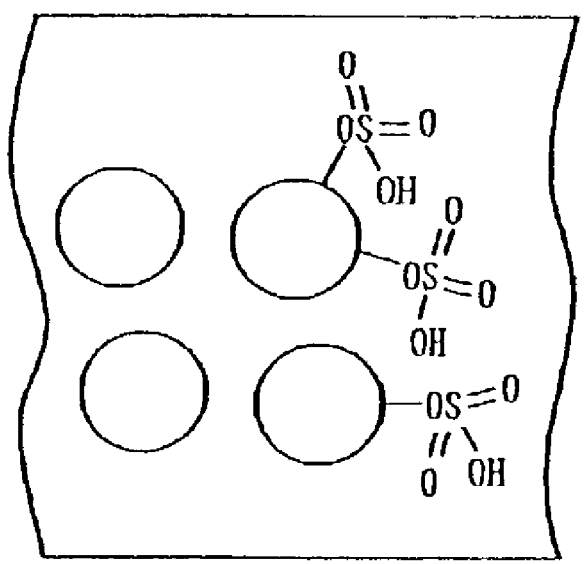

In an embodiment, the present invention can include a fullerene aggregate, having a number of —$OSO_3H$ groups, in addition to fullerenol, as a proton conductor. Fullerene polyhydroxide, in which $OSO_3H$ groups take the place of one or more OH groups, as shown in FIG. 4B, that is hydrogen sulfate ester type fullerenol, was also reported by Chiang et al in 1994 (Chiang. L. Y.; Wang, L. Y.; Swirczewski, J. W.; Soled, S.; Cameron, S., J. Org. Chem. 1994, 59, 3960). It should be noted that only $OSO_3H$ groups or a number of each of this group and the hydroxy group may also be contained in one molecule of the hydrogen sulfate ester type fullerenol.

As for the protonic conductivity, demonstrated on aggregating a large quantity of the above-mentioned fullerene derivative into a bulk material, the protons derived from the large number of hydroxy groups and/or $OSO_3H$ groups, inherently contained in the fullerene molecules, directly take part in migration, so that there is no necessity of capturing hydrogen or protons, derived from e.g., water vapor molecules, from atmosphere, or of replenishing water from outside, in particular, absorbing water from outside, there being no constraint imposed on the atmosphere to be in use. On the other hand, fullerene, forming the basis of these derivative molecules, can exhibit electrophilic properties, which are felt as significantly contributing to the promotion of ionization of hydrogen ions not only in highly acidic $OSO_3H$ groups but also in hydroxy groups. This accounts for excellent protonic conductivity of the proton conductor of the present invention.

Moreover, since a larger amount of hydroxyl and/or $OSO_3H$ groups can be introduced into one fullerene molecule, the number density of protons taking part in conduction per unit volume of the conductor is increased appreciably. This also accounts for an effective conductivity displayed by the proton conductor of the present invention.

A substantial portion of the proton conductor of the present invention is constituted by carbon atoms of fullerene, so that it is light in weight, unsusceptible to deterioration and is free of pollutants. The manufacturing cost of fullerene is also being lowered precipitously. Thus, in the light of resources, environment and economical merits, fullerene is believed to be a desirable carbonaceous material as compared to other comparable materials.

It should be appreciated that Applicants' investigations have revealed that the proton dissociating group does not have to be limited to hydroxyl groups and/or $OSO_3H$ groups.

Thus, it is sufficient if this dissociating group is represented by —XH, with X being an atom or group of atoms having divalent bonds. It is also sufficient if this group is represented by —OH or —YOH, with Y being an arbitrary atom or group of atoms having divalent bonds.

In an embodiment, the proton dissociating group may be any one of —COOH, —$SO_3H$ or —$PO(OH)_2$, in addition to —OH and —$OSO_3H$, like groups and combinations thereof.

For synthesizing a fullerene derivative, used in a proton conducting electrode according to an embodiment of the present invention, it is sufficient if any suitable proton dissociating group is introduced into constituent carbon atoms of fullerene molecules, by applying known processing techniques, such as acid processing or hydrolysis, in any suitable combination, to the powders of fullerene molecules.

According to an embodiment of the present invention, the mixture containing fullerene derivatives and electron conducting catalysts are desirably porous, with the porosity being preferably in a range of about 1% to about 90%. This enables the gas to be diffused to the entire electrode so as to form a three-phase interface in the entire electrode to increase the number of reaction points to improve the function of the electrode in generating and propagating protons.

The mixing ration by weight of the fullerene derivatives and the catalyst in the mixture containing fullerene derivatives and the electron conducting catalyst is preferably 1:100 to 100:1.

Moreover, the mixture is preferably formed in a layered form on a gas transmitting current collector, such as carbon paper. The mixture may be present as a sole layer or in a multi-layer structure.

The proton conducting electrode according to an embodiment of the present invention includes a gas transmitting current collector on which a mixture composed of the fullerene derivatives and the electron conducting catalyst is formed as a sole layer or in a multi-layer structure, as described above, as shown in FIGS. 5 and 6.

Figure 5:
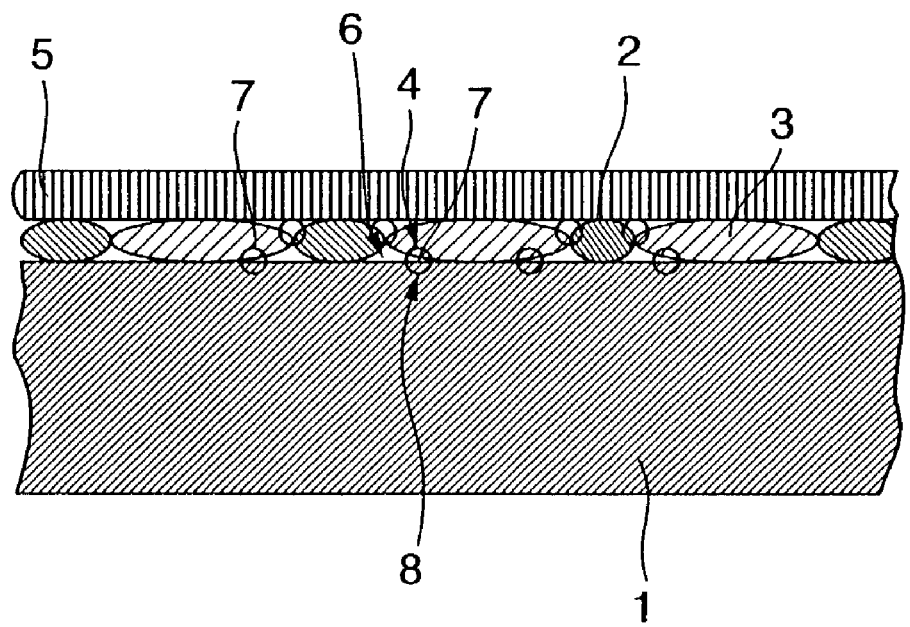
FIGS. 5 and 6 are schematic views showing examples of a proton conductor according to an embodiment of the present invention.

In the proton conducting electrode, shown in FIG. 5, a porous mixture, containing the fullerenol molecules 2 as a fullerenol derivative and the electron conducting catalyst 3, is diffusively coated on the surface of the proton conductor 1, with the surface of the porous mixture then being coated with the gas transmitting current collector 5.

Figure 6:
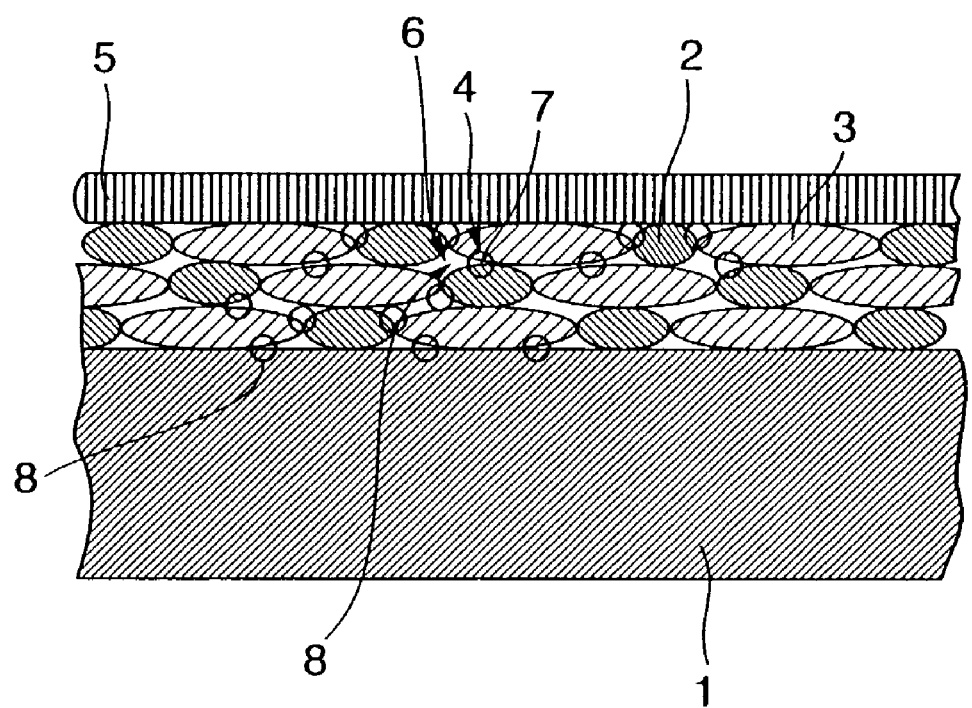

On the other hand, the proton conducting electrode, shown in FIG. 6, is obtained on coating a porous mixture of fullerenol molecules 2 and an electron conducting catalyst 3 in multiple layers.

The proton conducting electrode of an embodiment of the present invention, constructed as shown in FIGS. 5 and 6, uses a porous mixture containing fullerenol molecules 2 and the electron conducting catalyst 3, so that the gas can be permeated throughout the entire electrode. Moreover, since the fullerenol molecules 2 as a fullerene derivative having a proton dissociating capability and the electron conducting catalyst 3 are formed throughout the inside of the electrode, there is produced a three-phase interface 7 not only in the vicinity of a contact point between the proton conductor 1 and the catalyst 3, but also in the vicinity of a contact point between the catalyst 3 and the fullerenol molecules 2. This three-phase interface 7 is a site where the electrons ($e^-$) 4, protons ($H^+$) and the gases 6, such as hydrogen or oxygen gases all meet simultaneously.

Since the proton conducting electrode of the present invention is capable of producing the three-phase interface 7 not only in the vicinity of the contact point between the proton conductor 1 and the catalyst 3, but also in the vicinity of the contact point between the catalyst 3 and the fullerenol molecules 2, the function of the electrode in generating and propagating protons can be improved. Additionally, since the proton conducting electrode contains the fullerene derivative having the proton dissociating capability, the electrode can be used continuously even in a dry atmosphere.

The catalyst forming a porous mixture used in the proton conducting electrode according to an embodiment of the present invention is preferably formed of the porous material carrying electron conducting atoms. In this case, the amount of electron conducting atoms, carried by the porous material, is preferably about 10 wt % to about 50 wt %.

The atoms exhibiting electron conductivity (catalytic metal) may be platinum, ruthenium, vanadium, tungsten, the like or mixtures thereof, where the porous material may be carbon powders, porous Ni—Cr sintered material, $Al_2O_3$ sintered material, a porous plate of Li—Cr alloy, like materials or combinations thereof. Of these, the combination of platinum and carbon powders is desirable.

Preferably, electron conducting atoms are present in an amount of about 0.1 mg/cm$^2$ to about 10 mg/cm$^2$ between the proton conductor 1 and the gas transmitting current collector 5.

The proton conducting electrode according to an embodiment of the present invention can be used with advantage in a variety of electrochemical devices. That is, in a basic structure including first and second electrodes and a proton conductor sandwiched or disposed between these electrodes, at least the first one of the first and second electrodes may be the proton conducting electrode embodying the present invention.

The proton conducting electrode embodying the present invention may be used, for example, in an electrochemical device in which at least one of the first and second electrodes is a gas electrode.

The fuel battery employing the proton conducting electrode of the present invention is hereinafter explained.

Figure 7:
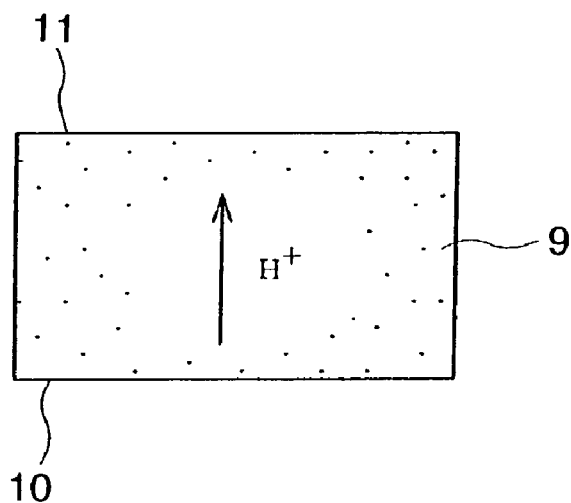
FIG. 7 is a schematic view showing an example of a proton conductor according to an embodiment of the present invention.

The mechanism of proton conduction of a fuel cell according to an embodiment of the present invention is as shown in the schematic view of FIG. 7. A proton conduction unit 9 is sandwiched between a first electrode 10, for example, a hydrogen electrode, and a second electrode 11, for example, an oxygen electrode, and dissociated protons ($H^+$) are migrated from the first electrode 10 towards the second electrode 11, as indicated by arrow in the drawing.

Figure 8:
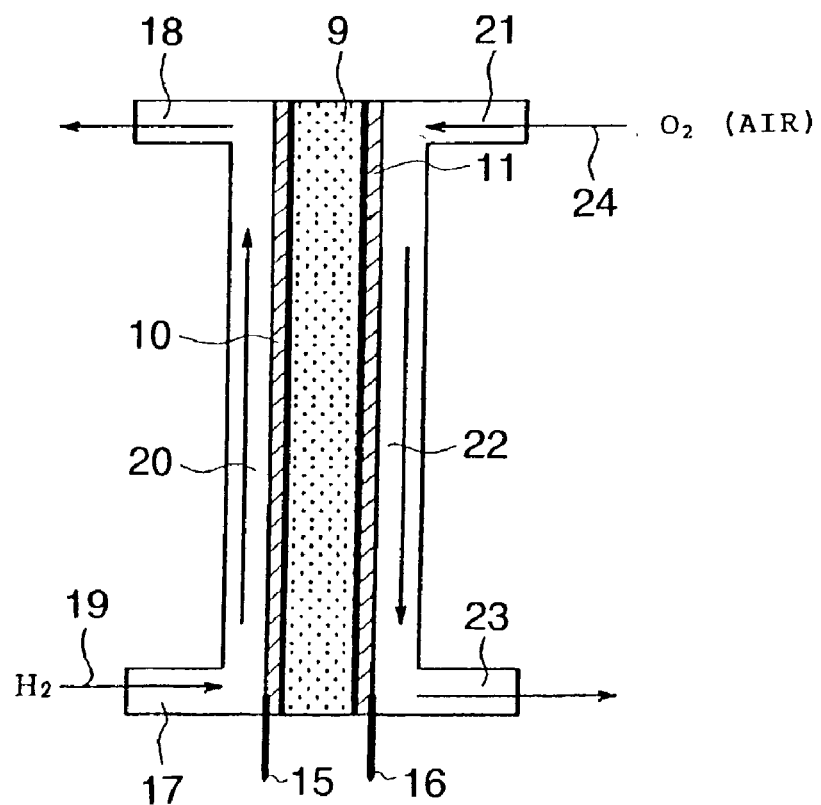
FIG. 8 schematically shows a structure of a fuel battery employing a proton conducting electrode according to an embodiment of the present invention.

FIG. 8 shows an exemplary fuel cell employing the proton conducting electrode according to an embodiment of the present invention. As shown in FIG. 8, this fuel cell includes a negative electrode 10, having a terminal 15 at one end, and which uses the proton conducting electrode according to the present invention, and a positive electrode 11, having a terminal 16 at one end, and which also uses the proton conducting electrode. In an embodiment, the negative electrode 10 can include a hydrogen fuel electrode, whereas the positive electrode 11 can include an oxygen electrode. It should be appreciated that it is not required to use the proton conducting electrode of the present invention as the positive electrode 11. The negative electrode 10 and the positive electrode 11 are arranged parallel to and facing each other, and the proton conduction unit 9 is sandwiched between the negative electrode 10 and the positive electrode 11, as shown in FIG. 8.

In use of the fuel battery, constructed as shown in FIG. 8, hydrogen acting as a fuel 19 is sent via an inlet 17 at the negative electrode 10 so as to be discharged at an optional exit port 18. A fuel ($H_2$) 19, supplied through inlet 17, yields protons as it traverses a flow channel 20, these protons migrating along with the protons generated in the negative electrode 10 and protons generated in the proton conduction unit 9 towards the positive electrode 11 where the protons are reacted with oxygen (air) 24 supplied from the inlet 21 to the flow channel 22 and which is then sent towards an exhaust port 23, thereby producing the desired electromotive force.

With the fuel battery of the present invention, employing the proton conducting electrode of the present invention, and constructed as shown in FIG. 8, protons are dissociated in the negative electrode 10 and, as the protons are dissociated in the proton conduction unit 9, the protons supplied from the negative electrode 10 are migrated towards the positive electrode 11, thus improving proton conductivity. Consequently, with the fuel battery of the present invention, no humidifying device etc is needed, so that the system is simplified and reduced in weight, while the function of the electrode, such as electrical density or output characteristics, may be improved.

In the electrochemical device, such as fuel battery or fuel cell, embodying the present invention, there is no particular limitation to the proton conductor sandwiched between the proton conducting electrodes, such that any suitable material exhibiting proton conductivity, such as fullerene hydroxide, hydrogen sulfate ester type fullerenol or Nafion, for example, may be used.

By way of example and not limitation, the following examples are provided to illustrate various embodiments of the present invention.

EXAMPLE

<Synthesis of Fullerene Polyhydroxide>

This synthesis was carried out using a reference material (Chiang, L. Y.; Wang. L. Y.; Swirczewski. J. W.; Soled, S.; Cameron, S., J. Org. Chem. 1994, 59, 3960). 2 g of powders of $C_{60}/C_{70}$ fullerene mixture, containing approximately 15% of $C_{70}$, were charged into 30 ml of fuming sulfuric acid and stirred for three days in a nitrogen atmosphere as the temperature was maintained at 60° C. The resulting reaction mass was charged gradually into anhydrous diethyl ether cooled in a glacial bath. The resulting precipitates were fractionated on centrifugation, washed three times with diethyl ether and twice with a 2:1 liquid mixture of diethyl ether and acetonitrile and dried under reduced pressure at 40° C. The dried product was charged into 60 ml of ion exchanged water and stirred for ten hours under bubbling with nitrogen at 85° C. The reaction product was freed on centrifugation from precipitates which were washed several times with pure water, repeatedly centrifuged and dried under reduced pressure at 40° C. The resulting brownish powders were subjected to FT-IR measurement. It was found by this measurement that the IR spectrum of the brownish powders approximately coincided with that of $C_{60}(OH)_{12}$, thus indicating that the powders were fullerene polyhydroxide powders as a target material. The above reaction can be represented for $C_{60}$ as follows:

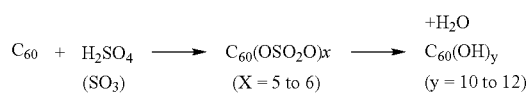

$$C_{60} + H_2SO_4 \xrightarrow{(SO_3)} C_{60}(OSO_2O)x \xrightarrow{+H_2O} C_{60}(OH)_y$$
$$(X = 5 \text{ to } 6) \quad (y = 10 \text{ to } 12)$$

<Preparation of Flocculated Pellets of Fullerene Polyhydroxide>

90 mg of powders of fullerene polyhydroxide were taken and pressed in one direction into circular pellets 15 mm in diameter. The pressing pressure at this time was approximately 5 ton/cm². It was found that the powders of fullerene polyhydroxide, while containing no binder resin or the like, were superior in moldability and could be formed into a pellet extremely readily. This pellet, about 300 µm in thickness, is termed a flocculated pellet of fullerene polyhydroxide.

<Synthesis of Fullerene Polyhydroxide Hydrogen Sulfate Ester (Full Ester)>

This synthesis was carried out using the above-mentioned reference material. 1 g of powders of fullerene polyhydroxide, was charged into 60 ml of fuming sulfuric acid and stirred for three days in a nitrogen atmosphere at ambient temperature. The resulting reaction mass was charged gradually into anhydrous diethyl ether cooled in a glacial bath. The resulting precipitates were fractionated on centrifugation, washed three times with diethyl ether and twice with a 2:1 liquid mixture of diethyl ether and acetonitrile and dried under reduced pressure at 40° C. The resulting brownish powders were subjected to FT-IR measurement. It was found by this measurement that the IR spectrum of the brownish powders approximately coincided with that of a compound all hydroxy groups of which are turned into a hydrogen sulfate ester, as indicated in the above reference material, thus indicating that the powders were fullerene polyhydroxide hydrogen sulfate ester as a target material.

The above reaction can be represented for $C_{60}(OH)_3$ as follows (hereinafter the same):

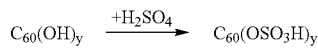

<Preparation of Flocculated Pellets of Fullerene Polyhydroxide Hydrogen Sulfate Ester>

70 mg of powders of fullerene polyhydroxide hydrogen sulfate ester were taken and pressed in one direction into circular pellets 15 mm in diameter. The pressing pressure at this time was approximately 5 ton/cm². It was found that the powders, containing no binder resin or the like, were superior in moldability and could be pelletized extremely readily. This pellet, about 300 μm in thickness, is termed a flocculated pellet of fullerene polyhydroxide hydrogen sulfate ester.

<Preparation of Flocculated Fullerene Pellet of Comparative Example>

For comparison, 90 mg of fullerene, used as a starting material for synthesis in the previous Example, were taken and pressed in one direction into circular pellets 16 mm in diameter. The pressing pressure at this time was approximately 5 ton/cm². It was found that the powders, containing no binder resin or the like, were superior in moldability and could be pelletized extremely readily. This pellet, about 300 μm in thickness, is termed a pellet of the Comparative Example.

Measurement of Proton Conductivity of Example (Flocculated Pellet of Fullerene Polyhydroxide Hydrogen Sulfate Ester) and Pellet of Comparative Example For measuring the conductivity of the pellets of the Example and the Comparative Example, each of the pellets was sandwiched between a pair of aluminum plates, each being 15 mm in diameter as is the pellet. An AC voltage of an amplitude of 0.1 V was applied to each assembly, with a frequency ranging from 7 MHz to 0.01 Hz, to measure the complex impedance at each frequency. The measurement was conducted in a dry atmosphere.

Figure 9A:
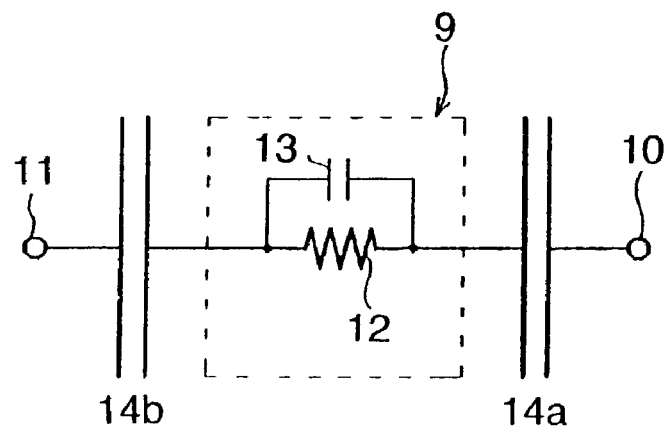
FIG. 9A shows an electrical equivalent circuit of a pellet made pursuant to an embodiment of the present invention.

In measuring the impedance, the proton conduction unit 9 of the proton conductor of the above-described embodiment, comprised of the pellet, electrically forms an equivalent circuit, shown in FIG. 9A, and forms capacitances 14a, 14b across the first and second electrodes 10, 11 and the proton conduction unit 9 represented by a parallel connection of a resistance and a capacitance where a capacitance 13 represents the delay effect on proton migration (phase delay for a high frequency), while a resistance 12 represents a parameter of proton mobility.

The complex impedance Z is represented by $Z=Re(Z)+i\cdot Im(Z)$. The frequency dependency of the proton conduction unit, represented by the above-described equivalent circuit, was checked.

Figure 9B:
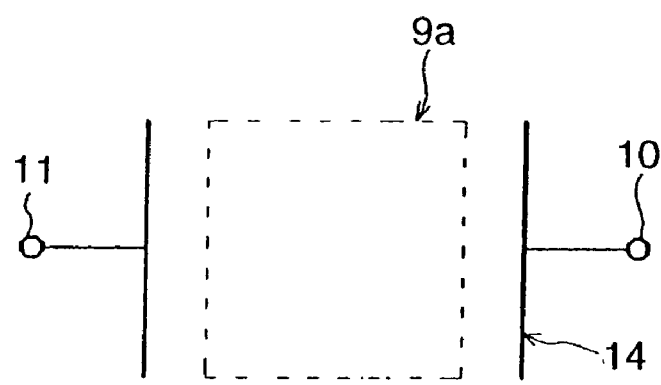
FIG. 9B shows an equivalent electrical circuit of a pellet made with fullerene molecules without proton dissociating properties.

FIG. 9B shows an equivalent circuit in case of using the ordinary fullerene molecules not having proton dissociating properties, as in the above-described Comparative Example. In FIG. 9B, the equivalent circuit represents a capacitor 14 that includes an insulator 9a (i.e., the fullerene pellet) disposed between a first electrode 10 and a second electrode 11.

Figure 10:
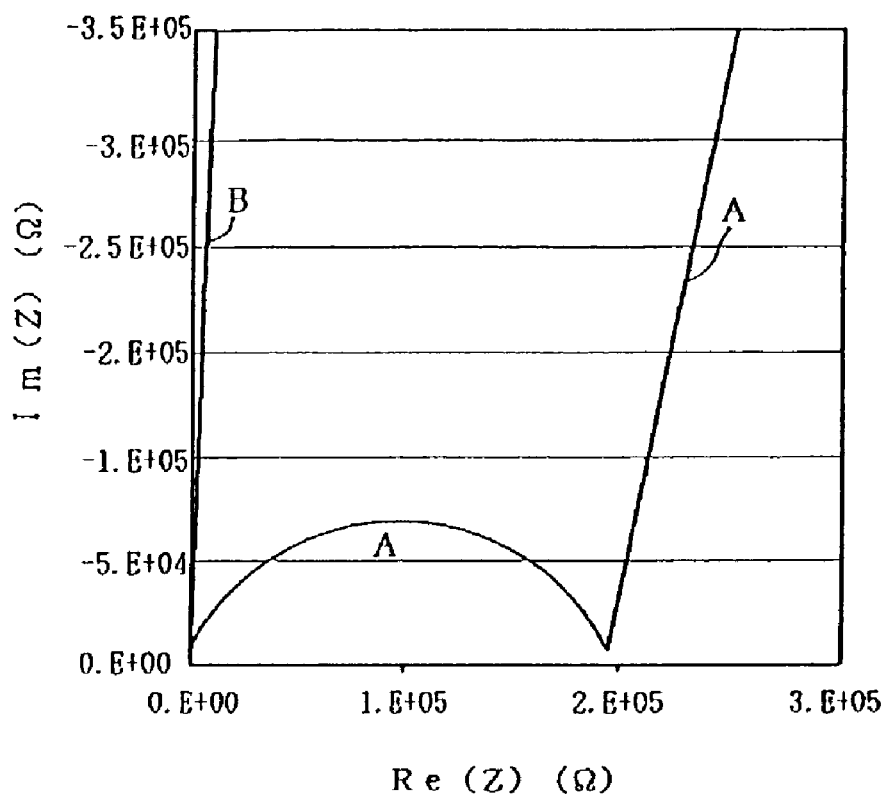
FIG. 10 is a graph showing complex impedance measurements with respect to an experimental study as described below.

FIG. 10 shows the results of impedance measurement for the pellets in the Example and in the Comparative Example.

It may be seen from FIG. 10 that the frequency response of the complex impedance of the Comparative Example as shown at B is approximately similar to a response of a single capacitor as expressed by the equivalent circuit in FIG. 9B while the conduction behavior of charged particles, such as electrons or ions of the flocculated mass of the fullerene itself, was not measurable. Conversely, in the Example, an extremely fine semi-circular arc, though somewhat flat, may be observed in a high frequency portion as shown at A in FIG. 10. This indicates that there exists some conduction behavior of charged particles within the pellet of the Example. Additionally, there may be noticed an acute rise of the imaginary portion of the impedance in the low frequency region. This indicates that blocking of charged particles with the aluminum electrode occurs as the DC voltage is approached. Since the charged particles on the side aluminum electrode are naturally electrons, it may be seen that the charged particles within the pellet of the Example are the particles other than electrons or holes, that is ions. Judging from the structure of fullerenol used, this suggests that the charged particles are protons.

The conductivity of the charged particles can be found from the X-axis intercept of the arc seen towards the high frequency side. In the pellet of the Example, it may be calculated to be approximately $5\times 10^{-6}$ S/cm. It could be found that the flocculated mass of this type of fullerene derivative allows proton conduction at ambient temperature in a dry atmosphere.

Figure 11:
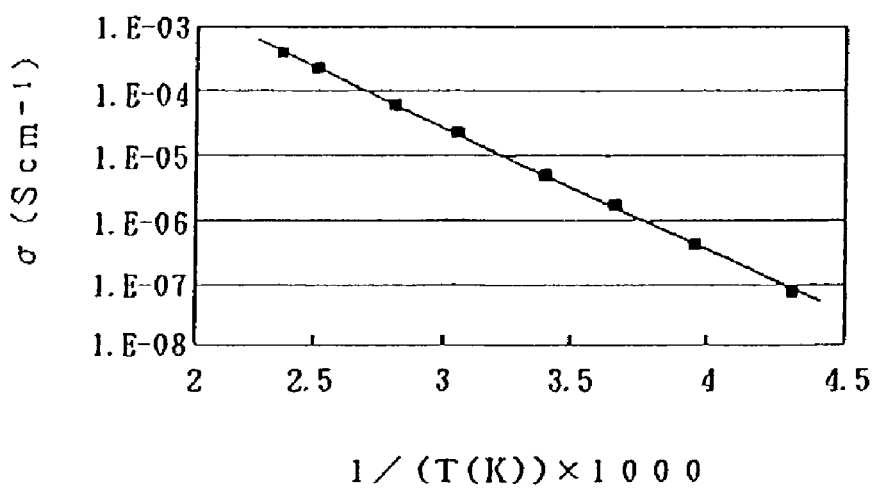
FIG. 11 is a graph showing the temperature dependency of the protonic conductivity of a pellet made pursuant to an embodiment of the present invention.

Using the pellet of the Example (flocculated pellet of fullerene polyhydroxide hydrogen sulfate ester), the above-mentioned measurement of the complex impedance was conducted in a temperature range from 160° C. to −40° C., to check for temperature dependency of the conductivity as found from the arc on the side high frequency. The results are shown as an Arrhenius plot in FIG. 11, from which it may be seen that the conductivity is changed linearly in a temperature range from 160° C. to −40° C. In short, this figure shows that the sole ion conduction mechanism can proceed in the above temperature range. That is, the flocculated mass of the fullerene derivative used in the present invention allows for proton conduction in a broad temperature range inclusive of the ambient temperature, in particular, even at an elevated temperature of 160° C. or a low temperature of −40° C.

Preparation of Fuel Batteries of Example and Comparative Example and Power Generation Test Powders of carbon carrying 20 wt % of platinum (mean particle size: 50 nm) and powders of fullerene polyhydroxide hydrogen sulfate ester, obtained as described above, were mixed together at a weight ratio of 1:2 and mixed in a solution of tetrahydrofuran (THF). The resulting mixture was coated on a carbon paper to a platinum carrying amount of 1 mg/cm² to form a fullerenol containing electrode of the present invention to a thickness of 50 μm.

Two fullerenol containing electrodes according to an embodiment of the present invention were prepared to form a fuel battery device that included the electrodes placed on both sides of a thin film of a flocculated mass of the powders of fullerene polyhydroxide (thickness: 25 μm) as a proton conductor. This fuel battery device was built in the fuel battery cell shown in FIG. 8. The one side (negative electrode side) and the other side (positive electrode side) of the fuel battery device shown in FIG. 8 were opened to a dry hydrogen gas and to a dry oxygen gas, respectively, to carry out a power generation test at ambient temperature.

By way of a Comparative Example, carbon powders (mean particle size: 50 nm) carrying 20 wt % of platinum were coated on a carbon paper, using a Nafion solution, to a platinum carrying amount of 1 mg/cm² and the Nafion quantity of 2 mg/cm², to prepare a Nafion mixture electrode.

Two electrodes of the Nafion mixture were prepared and placed on either sides of a thin film composed of powders of fullerene polyhydroxide (thickness: 25 μm) to prepare a fuel battery device, which then was built into a fuel battery cell shown in FIG. 8. The one side (negative electrode side) and the other side (positive electrode side) of the fuel battery device shown in FIG. 8 were opened to a dry hydrogen gas and to a dry oxygen gas, respectively, to carry out a power generation test at ambient temperature.

Figure 12:
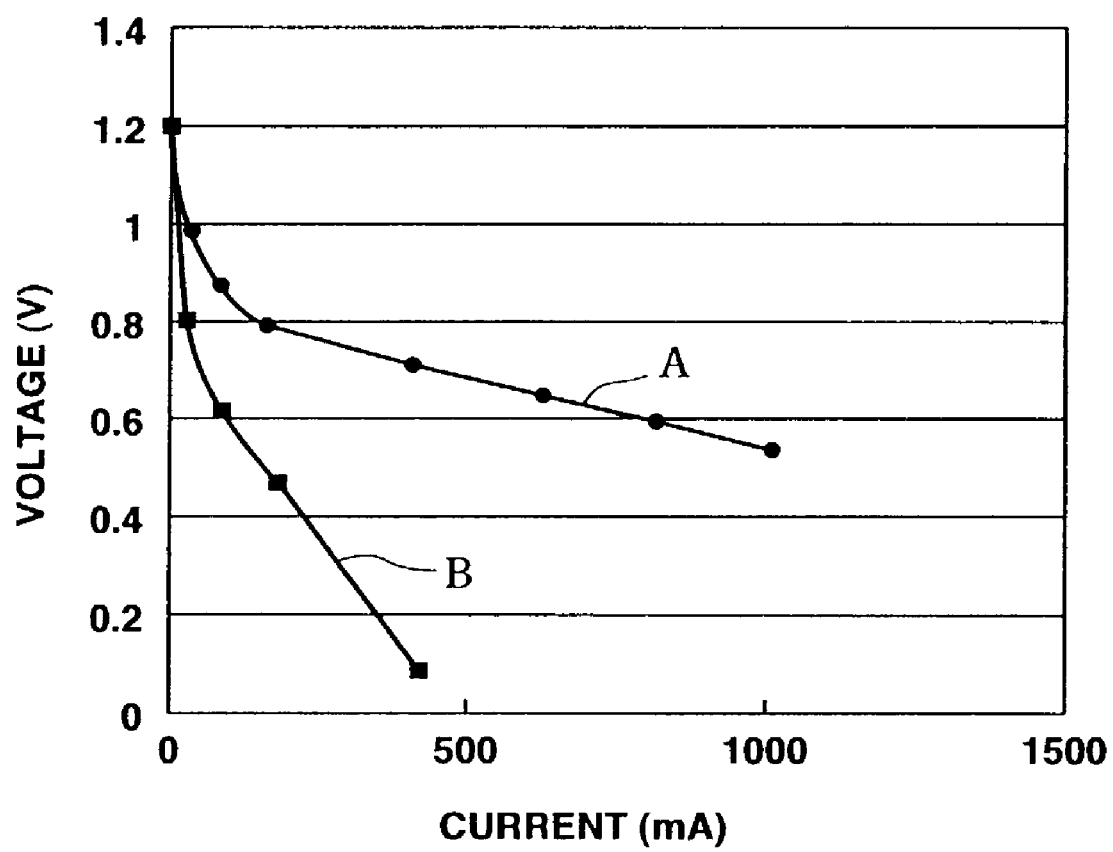
FIG. 12 shows the comparative results of power generation of a fuel battery employing a proton conducting electrode according to an embodiment of the present invention.

The results of each power generation test are shown in FIG. 12.

These results indicate that, while the open voltage is approximately 1.2 V for both the Example and the Comparative Example, the Example employing the electrode of the fullerenol mixture shows characteristics shown at A in FIG. 12. That is, the Example is improved in current density and has enhanced output characteristics as compared to the Comparative Example of the electrode of the Nafion mixture shown at B in FIG. 12.

Since the proton conducting electrode, in an embodiment of the present invention, is a mixture of a fullerene derivative and an electron conducting catalyst, in which the fullerene derivative is composed of carbon atoms forming fullerene molecules and proton dissociating groups introduced therein, a three-phase interface can be present in a sufficient quantity in the electrode, so that the electrode has enhanced properties for generating and propagating protons.

Moreover, since the proton conducting electrode uses a fullerene derivative, it is low in atmosphere dependency and can be used continuously even in a dry atmosphere, so that it is able to demonstrate enhanced proton conductivity which is desirable in the electro-chemical device.

Since no atmosphere constraint is placed on the electrochemical device, employing the proton conducting electrode according to an embodiment of the present invention, the system can be reduced in size and simplified in structure, while it is possible to develop optimum current density and output characteristics.

It should be understood that various changes and modifications to the presently preferred embodiments described herein will be apparent to those skilled in the art. Such changes and modifications can be made without departing from the scope and spirit of the present invention and without diminishing its intended advantages. It is therefore intended that such changes and modifications be covered by the appended claims.

The invention claimed is:

1. A proton conducting electrode comprising a mixture including a fullerene derivative and an electron conducting catalyst, wherein the fullerene derivative is composed of carbon atoms forming fullerene molecules that have a proton dissociating group introduced into the carbon atoms.

2. The proton conducting electrode according to claim 1 wherein the proton dissociating group is —XH, where X is an atom having a divalent bond, and H is a hydrogen atom.

3. The proton conducting electrode according to claim 1 wherein the proton dissociating group is selected from the group consisting of OH and —YOH, where Y is selected from the group consisting of an atom having a divalent bond and a group of atoms having a divalent bond.

4. The proton conducting electrode according to claim 3 wherein the proton dissociating group is selected from the group consisting of —OH, —OSO₃H, —COOH, —SO₃H, —PO(OH)₃ and mixtures thereof.

5. The proton conducting electrode according to claim 1 wherein the mixture is porous.

6. The proton conducting electrode according to claim 1 wherein the mixture has a structure selected from the group consisting of a single-layer structure and a multi-layer structure.

7. The proton conducting electrode according to claim 1 wherein a mixing ratio by weight of the fullerene derivative and the catalyst in the mixture ranges from about 1:100 to about 100:1.

8. The proton conducting electrode according to claim 1 wherein the mixture has a porosity of about 1% to about 90%.

9. The proton conducting electrode according to claim 1 wherein the mixture is formed as a layer on a gas transmitting current collector.

10. The proton conducting electrode according to claim 9 wherein the gas transmitting current collector is carbon paper.

11. The proton conducting electrode according to claim 1 wherein the catalyst is a porous material impregnated with electron conducting atoms that exhibit electron conductivity.

12. The proton conducting electrode according to claim 11 wherein the electron conducting atoms include platinum and the porous material is composed of carbon powders.

13. The proton conducting electrode according to claim 11 wherein the porous material is impregnated with the electron conducting atoms in an amount ranging from about 1% to about 50% by weight of the porous material.

14. The proton conducting electrode according to claim 11 wherein the mixture is formed as a layer on a gas transmitting current collector and the electron conducting atoms are present on the gas transmitting current collector in an amount ranging from about 0.1 mg/cm² to about 10 mg/cm².

15. The proton conducting electrode according to claim 1 wherein the fullerene molecules include a spherically-shaped carbon cluster having the general formula $C_m$, where m is at least one of 36, 60, 70, 76, 78, 82 and 84.

16. A method of producing a proton conducting electrode comprising:
    coating a mixture of a fullerene derivative and an electron conducting catalyst on a gas transmitting current collector wherein the fullerene derivative is composed of carbon atoms forming fullerene molecules that have a proton dissociating group introduced in the carbon atoms; and
    forming the proton conducting electrode.

17. The method according to claim 16 wherein the proton dissociating group is —XH, where X is an atom having a divalent bond, and H is a hydrogen atom.

18. The method according to claim 16 wherein the proton dissociating group is selected from the group consisting of —OH and —YOH, where Y is selected from the group consisting of an atom having a divalent bond and a group of atoms having a divalent bond.

19. The method according to claim 16 wherein the proton dissociating group is selected from the group consisting of —OH, —OSO₃H, —COOH, —SO₃H, —PO(OH)₃ and mixtures thereof.

20. The method according to claim 16 wherein the mixture is porous.

21. The method according to claim 16 wherein the mixture is coated as a single layer.

22. The method according to claim 16 wherein the mixture is coated as a multiple layer.

23. The method according to claim 16 wherein the catalyst is a porous material impregnated with electron conducting atoms that exhibit electron conductivity.

24. The method according to claim 23 wherein the electron conducting atoms include platinum and the porous material is composed of carbon powders.

25. The method according to claim 23 wherein an amount of the electron conducting atoms in the porous material ranges from about 1 wt % to about 50 wt %.

26. The method according to claim 23 wherein the electron conducting atoms are present on the gas transmitting current collector in an amount ranging from about 0.1 $mg/cm^2$ to about 10 $mg/cm^2$.

27. The method according to claim 16 wherein a mixing ratio by weight of the fullerene derivative and the catalyst in the mixture ranges from about 1:100 to about 100:1.

28. The method according to claim 16 wherein the mixture has a porosity of about 1% to about 90%.

29. The method according to claim 16 wherein the gas transmitting current collector is carbon paper.

30. The method according to claim 16 wherein the fullerene molecules include a spherically-shaped carbon cluster having the general formula $C_m$, where m is at least one of 36, 60, 70, 76, 78, 82 and 84.

31. An electro-chemical device comprising a first electrode, a second electrode and a proton conductor disposed between the first and second electrodes, wherein at least one of the first electrode and second electrode includes a proton conducting electrode including a mixture that includes an electron conducting catalyst and a fullerene derivative composed of carbon atoms forming fullerene molecules that have a proton dissociating group introduced into the carbon atoms.

32. The electrochemical device according to claim 31 wherein the proton dissociating group is —XH, where X is an atom having a divalent bond, and H is a hydrogen atom.

33. The electrochemical device according to claim 31 wherein the proton dissociating group is selected from the group consisting of —OH and —YOH, where Y is selected from the group consisting of an atom having a divalent bond and a group of atoms having a divalent bond.

34. The electrochemical device according to claim 31 wherein said proton dissociating group is selected from the group consisting of —OH, —OSO$_3$H, —COOH, —SO$_3$H, —PO(OH)$_3$ and combinations thereof.

35. The electrochemical device according to claim 31 wherein the mixture is porous.

36. The electrochemical device according to claim 31 wherein the mixture is coated as a single layer.

37. The electrochemical device according to claim 31 wherein the mixture is coated as a multiple layer.

38. The electrochemical device according to claim 31 wherein the mixture is formed as a layer on a gas-transmitting current collector.

39. The electrochemical device according to claim 38 wherein the gas transmitting current collector is carbon paper.

40. The electro-chemical device according to claim 31 wherein a mixing ratio by weight of the fullerene derivative and the catalyst in the mixture ranges from about 1:100 to about 100:1.

41. The electro-chemical device according to claim 31 wherein the mixture has a porosity of about 1% to about 90%.

42. The electrochemical device according to claim 31 wherein the catalyst is a porous material impregnated with electron conducting atoms that exhibit electron conductivity.

43. The electro-chemical device according to claim 42 wherein the electron conducting atoms include platinum and the porous material is composed of carbon powders.

44. The electro-chemical device according to claim 42 wherein the amount of the electron conducting atoms impregnated in the porous material ranges from about 1 wt % to about 50 wt %.

45. The electro-chemical device according to claim 42 wherein the mixture is formed as a layer on a gas-transmitting current collector and the electron conducting atoms are present on the gas transmitting current collector in an amount ranging from about 0.1 $mg/cm^2$ to about 10 $mg/cm^2$.

46. The electro-chemical device according to claim 31 wherein the fullerene molecules comprise a spherically-shaped carbon cluster having the general formula $C_m$, where m is an integer selected from the group consisting of 36, 60, 70, 76, 78, 82, 84 and combinations thereof.

47. The electro-chemical device according to claim 31 wherein at least one of said first and second electrodes is a gas electrode.

48. The electrochemical device according to claim 31 wherein the device is constructed as a fuel cell.

* * * * *